US00RE42351E

(19) United States
(12) Reissued Patent
Bryant

(10) Patent Number: US RE42,351 E
(45) Date of Reissued Patent: May 10, 2011

(54) MULTIPLE CREDIT METER

(75) Inventor: Natalie Bryant, Lane Cove (AU)

(73) Assignee: Aristocrat Technologies Australia Pty Ltd, New South Wales (AU)

( * ) Notice: This patent is subject to a terminal disclaimer.

(21) Appl. No.: 12/371,123

(22) PCT Filed: Apr. 18, 2001

(86) PCT No.: PCT/AU01/00441

§ 371 (c)(1),
(2), (4) Date: Sep. 20, 2002

(87) PCT Pub. No.: WO01/83061

PCT Pub. Date: Nov. 8, 2001

Related U.S. Patent Documents

Reissue of:
(64) Patent No.: 7,175,527
Issued: Feb. 13, 2007
Appl. No.: 10/239,336
Filed: Sep. 20, 2002

(30) Foreign Application Priority Data

Apr. 28, 2000 (AU) ..... PQ 7161

(51) Int. Cl.
*A63F 9/24* (2006.01)

(52) U.S. Cl. ..... 463/25; 463/30; 463/31

(58) Field of Classification Search ..... 463/25, 463/30, 31; 273/138.1, 138.2, 460
See application file for complete search history.

(56) References Cited

U.S. PATENT DOCUMENTS

| | | | | |
|---|---|---|---|---|
| 4,805,907 | A | 2/1989 | Hagiwara | |
| 5,046,736 | A * | 9/1991 | Bridgeman et al. | 463/13 |
| 5,275,400 | A | 1/1994 | Weingardt et al. | |
| 5,299,803 | A | 4/1994 | Halaby | |
| 5,470,079 | A | 11/1995 | LeStrange et al. | |
| 6,004,205 | A | 12/1999 | Lauretta et al. | |
| 6,308,953 | B1 | 10/2001 | Nagano | |

FOREIGN PATENT DOCUMENTS

| | | |
|---|---|---|
| EP | 507435 | 10/1992 |

(Continued)

OTHER PUBLICATIONS

International Search Report, mailed by ISA on Jun. 7, 2001.

*Primary Examiner* — David L Lewis
*Assistant Examiner* — Robert Mosser
(74) *Attorney, Agent, or Firm* — McAndrews, Held & Malloy, Ltd.

(57) ABSTRACT

A gaming machine (10) has a display (14) and a game controller (36) arranged to control images displayed on the display (14). The game controller (36) is arranged to play a game (16) wherein one or more random events are caused to be displayed on and, if a predefined winning event results, the machine (10) awards a prize. The display (14) includes a plurality of credit meters (52, 54) each of which is allocated to a player. The machine (10) includes a credit allocating device (60, 62) such that, when each player deposits credit into the machine (10). each player's credit is credited to the player's allocated credit meter (52, 54).

32 Claims, 13 Drawing Sheets

FOREIGN PATENT DOCUMENTS

| | | | |
|---|---|---|---|
| EP | 507435 | A | 10/1992 |
| GB | 2117546 | | 10/1983 |
| GB | 2117546 | A | 10/1983 |
| GB | 2148037 | | 5/1985 |
| GB | 2148037 | A | 5/1985 |
| WO | 97/27569 | | 7/1997 |
| WO | WO 97/27569 | | 7/1997 |

* cited by examiner

MULTIPLE CREDIT METER

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 7,175,527. The reissue applications are the present reissue application, which is application Ser. No. 12/371,123, filed on Feb. 13, 2009, and a continuation of the present reissue application, which is application Ser. No. 12/371,289, filed on Feb. 13, 2009.*

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games which are popular with the players as a mechanism for improving sales, retaining customers and attracting new customers.

SUMMARY OF THE INVENTION

According to the invention, there is provided a gaming machine having a display means and a game control means arranged to control images displayed on the display means, the game control means being arranged to play a game wherein one or more random events are caused to be displayed on the display means and, if a predefined winning event results, the machine awards a prize, the gaming machine being characterized in that the display means includes a plurality of credit meters each of which is allocated to a player of the game for enabling more than one person to play the game and further being characterized in including a credit allocating means such that, when each player deposits credit into the machine, each player's credit is credited to the player's allocated credit meter, the credit allocating means comprising a switch arrangement for allocating that player's credits to that player's meter.

Each credit meter may form part of a set of meters. The set of meters may comprise, in addition to the credit meter, a win meter. Further, the set of meters may include a bet meter. For ease of explanation, each set of meters shall be referred to in this specification as a "meter".

Each meter may be operable to indicate which player's turn it is and also which player has received a highest win in a round of games played by participating players.

The switch arrangement may comprise a bank of mechanical switches which, conveniently, may be arranged on a midtrim of the machine. The switch arrangement may include a switch associated with each player of the game, the switches being operable to change a turn of each player. Each switch may also be operable to initiate the game for the player whose turn it is.

In addition or, instead of the mechanical switches, the switch arrangement may be implemented by means of touch sensors associated with the display means.

The credit allocating means may be operable, upon completion of play by any one of the players, to pay out each withdrawing player's credit.

In the preferred embodiment of the invention, the machine is intended to be played by at least two players. However, the gaming machine may have a default mode where, if only one player wishes to play the machine, only a single credit meter is displayed and the credit allocating means allocates any credit deposited to said single meter.

The meters may be displayed on the display means alternately depending on which player is playing rather than being displayed simultaneously on the display means.

Further, it will be appreciated that the credit deposited by a player need not be money but could result from a token, an information-carrying card, reference to an account, or the like.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
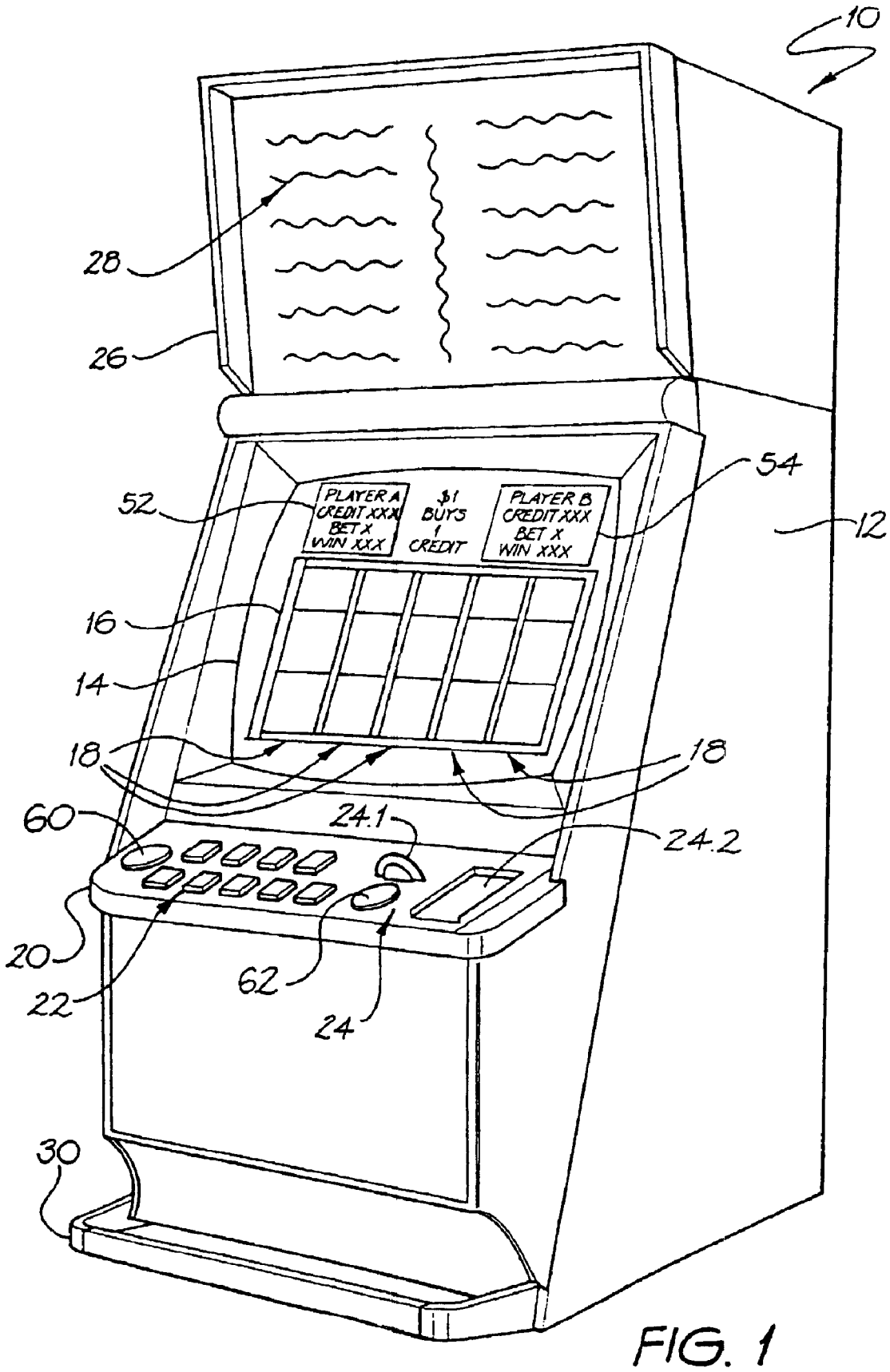
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
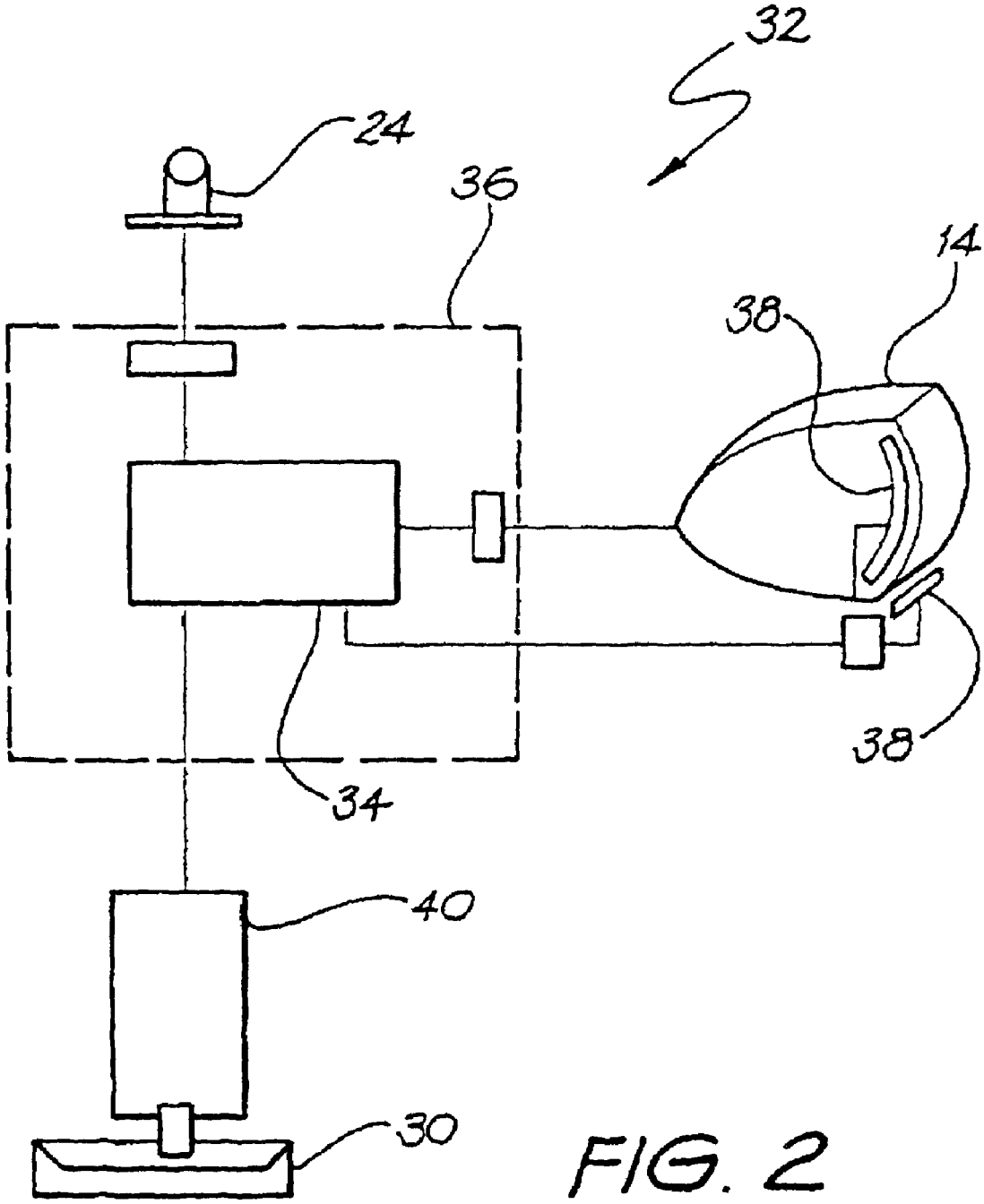
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
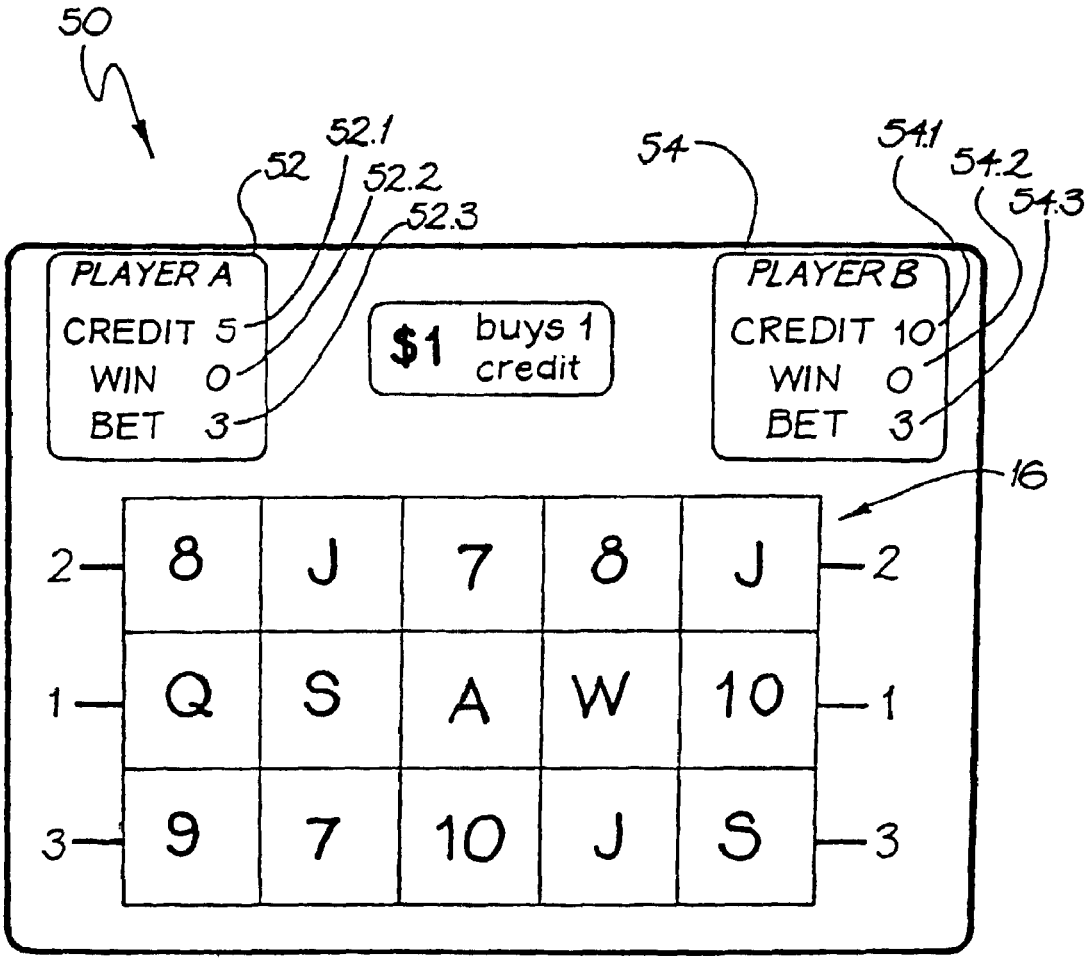
FIG. 3 shows a screen display of a game played on the gaming machine of FIG. 1.
Figure 4:
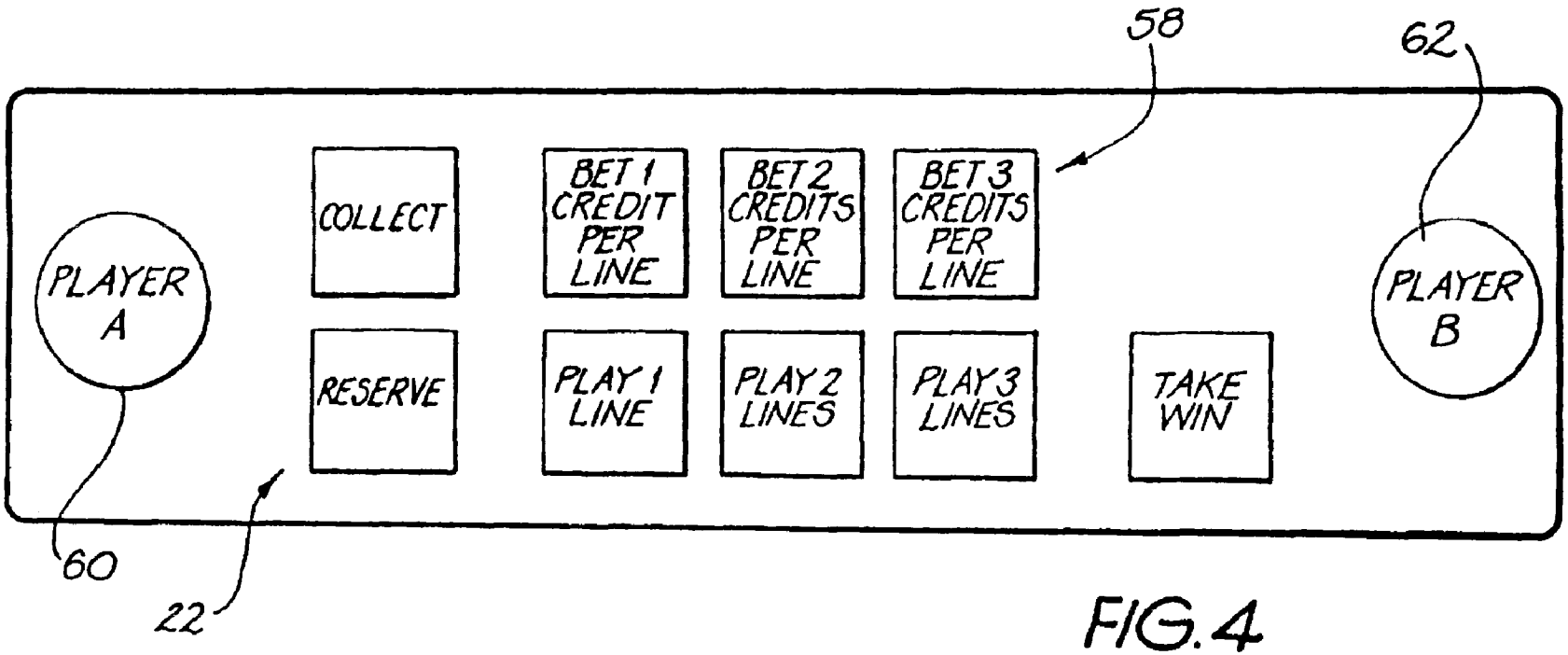
FIG. 4 shows a plan view of a midtrim of the gaming machine.

Referring now to FIG. 3 of the drawings, a screen display 50 of a game played on the gaming machine 10 is shown. In the embodiment illustrated, the screen display 50 displays two meters 52, 54 in addition to the game display of the game 16. The meter 52 comprises a credit meter 52.1, a win meter 52.2 and a bet meter 52.3. Similarly, the meter 54 comprises a credit meter 54.1, a win meter 54.2 and a bet meter 54.3.

In addition to the bank 22 of buttons on the midtrim 20, the machine 10 includes a credit allocating means comprising a pair of buttons 60 and 62 so that, when each player deposits credit into the machine 10, it is done via the appropriate buttons 60 or 62 as will be described in greater detail below.

The single credit input mechanism 24 is used by both players.

In use, if credit is inserted while the gaming machine 10 is in a state of zero credit without either button 60 or 62 having been pressed immediately beforehand then the gaming machine 10 will function as standard. In other words, there will only be a single meter, meter 52, which is displayed. Otherwise, when the single meter 52 is at zero, two players may commence a combined playing session by first pressing the button 60 after which the two meters 52 and 54 will be displayed. The first player, player A, inserts credit and this is credited to the credit meter 52.1 of the meter 52. If the button 62 is pressed before button 60 has been pressed, a message will be displayed explaining that player A must insert credit first. After player A has finished inserting credit, the button 62 is pressed prior to inserting more credit When button 62 is pressed and the other player, player B, inserts credit, the credit is credited to the credit meter 54.1 of the meter 54. If the credit is not inserted into the gaming machine 10 in a timely manner, for example, within fifteen seconds of button 60 having been pressed while at zero credit, then the screen 50 will revert to a standard display, i.e. with only the single meter 52 being displayed. Similarly, if a game is played only after player A has inserted credit, then the display will revert to the single meter mode with only the meter 52 displayed and any credits won will be credited to the credit meter 52.1 of the meter 52.

Accordingly, when two players wish to play the game 16 on the gaming machine 10, the button 60 is initially pressed when the gaming machine 10 is in a state of zero credit. The meters 52 and 54 default to a current bet and the number of lines applicable to the game result currently displayed.

Figure 5A:
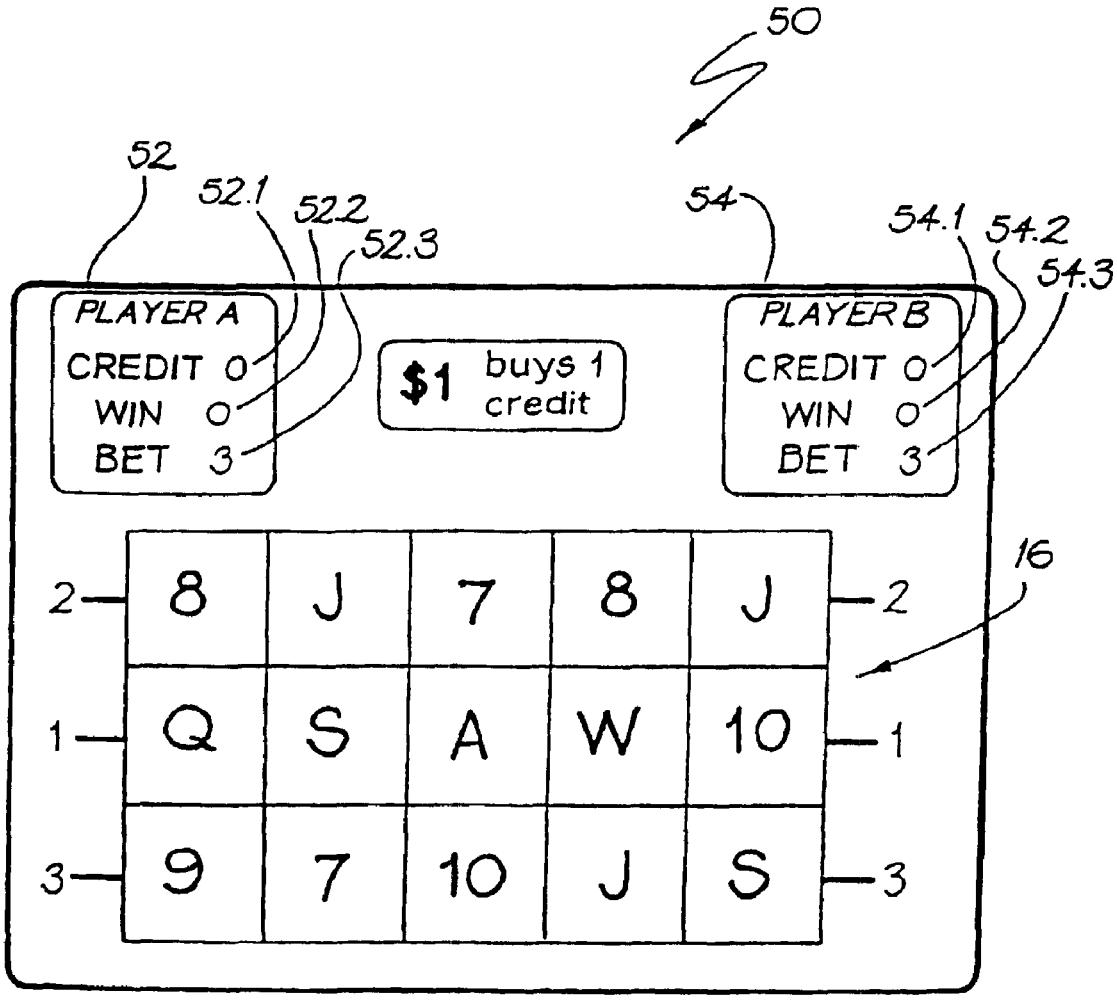
FIGS. 5a–5c show a sequence of screen displays of one embodiment of a game played on the gaming machine.

Thus, as shown in FIG. 5a of the drawings, initially, the credit meters 52.1 and 54.1 both show zero credit. The bet meters 52.3 and 54.3 show the condition as it existed immediately before the start of play by the two players. The win meters 52.2 and 54.2 both initialise to zero irrespective of whether or not the previous single-player game resulted in a win.

Figure 5B:
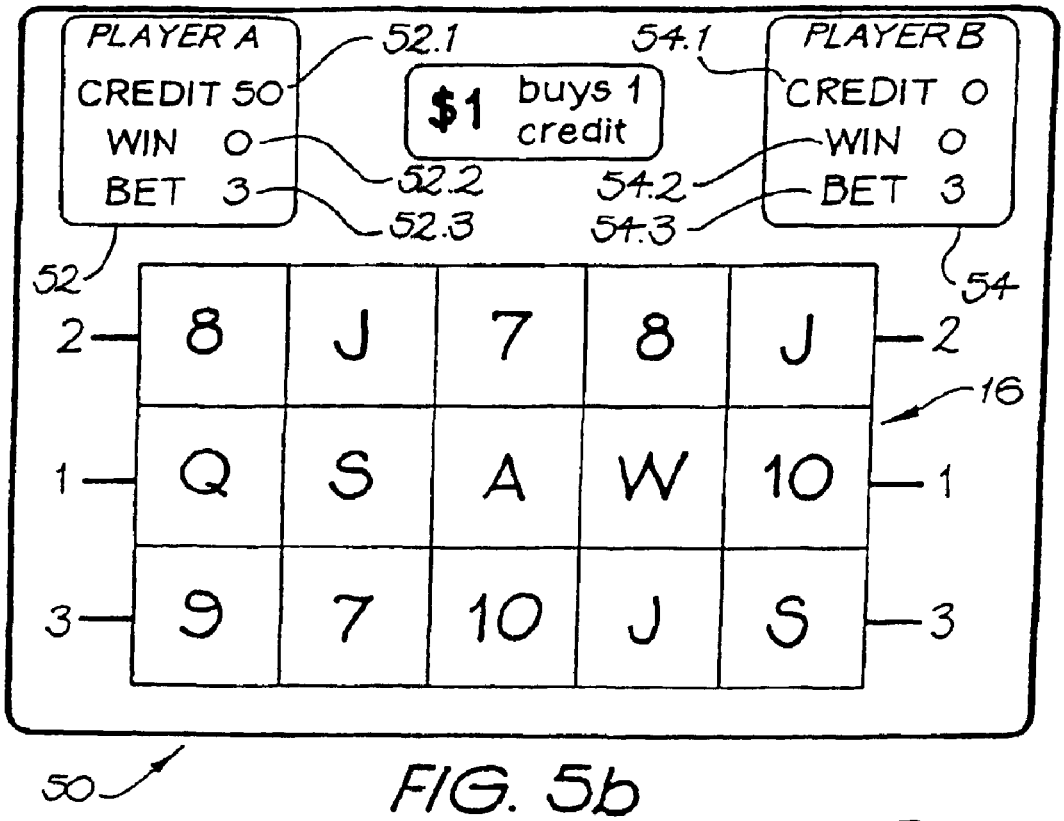

Assuming the first player, player A, deposits fifty credits into the machine, the credit meter 52.1 is changed to show the fifty credits as shown in FIG. 5b of the drawings. In addition, the meter 52 is highlighted.

Figure 5C:
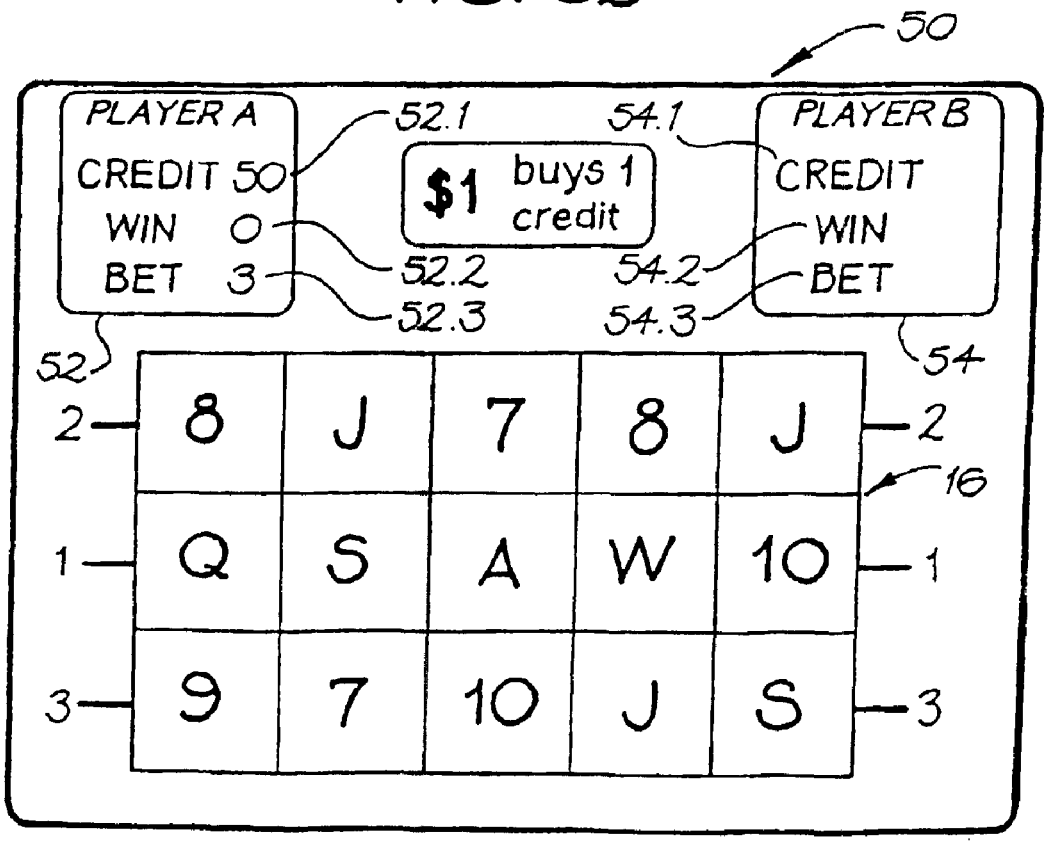

Then, player B presses button 62 and player B inserts twenty credits via the credit input mechanism 24. The meter 54 is highlighted and the twenty credits are credited to the credit meter 54.1 of the meter 54 as shown in FIG. 5c.

Figure 6A:
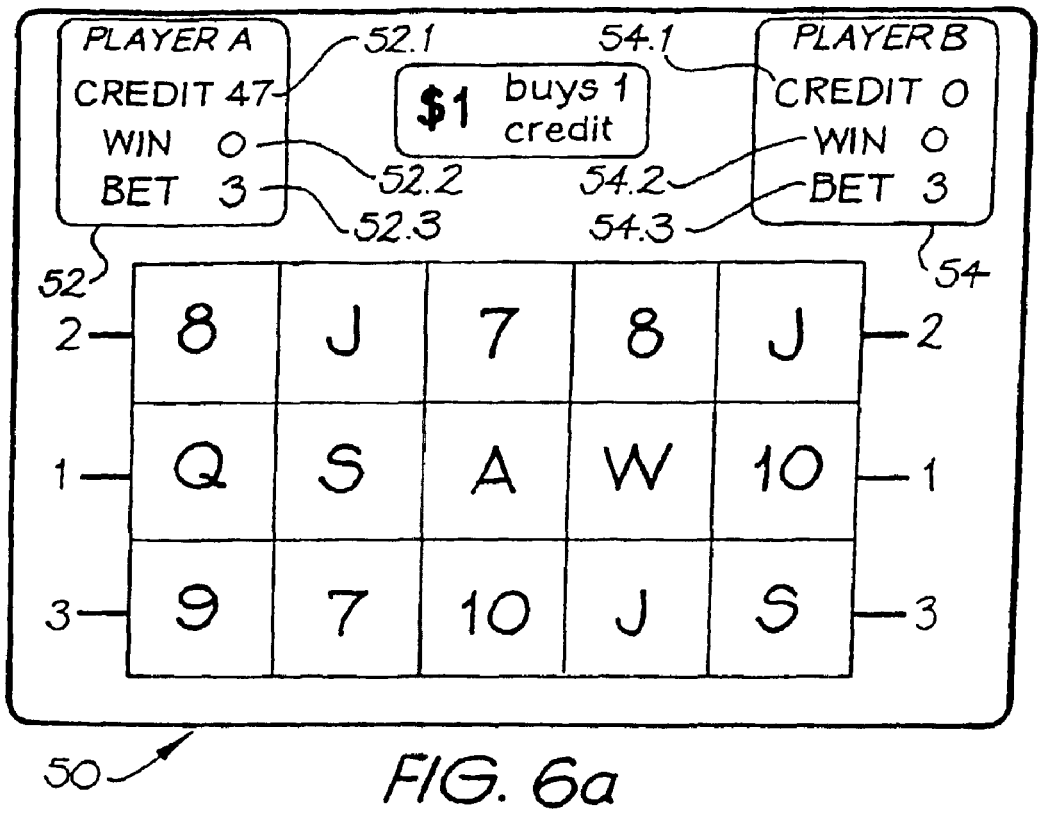
FIGS. 6a and 6b show a sequence of screen displays of a second embodiment of a game played on the gaming machine.
Figure 6B:
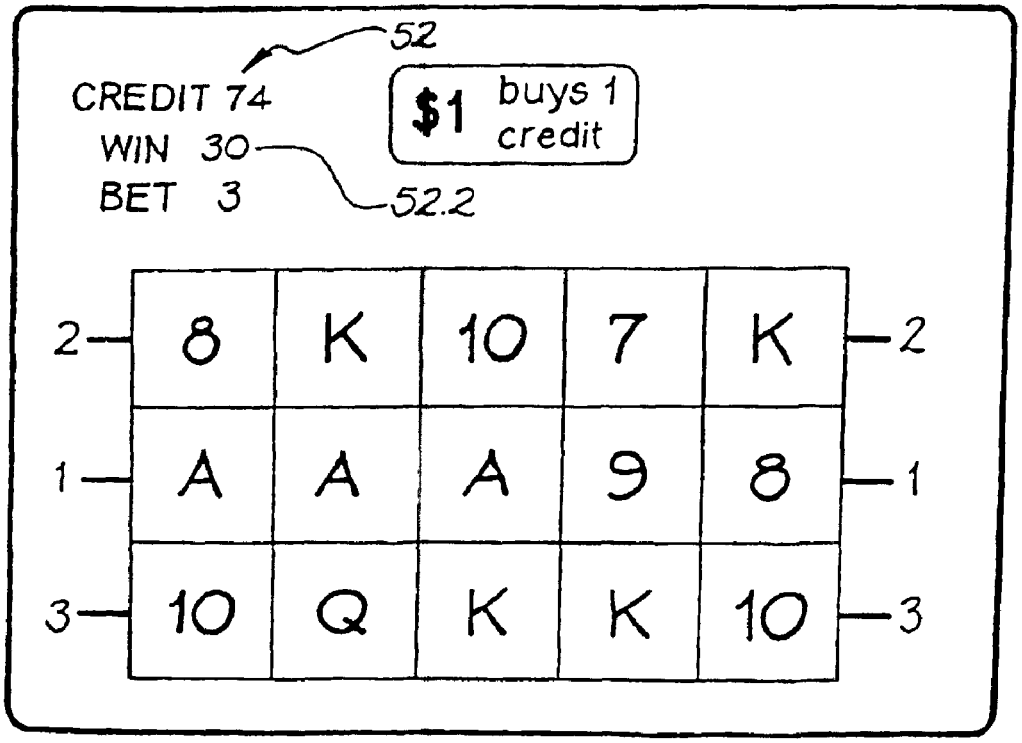

Referring now to FIG. 6a of the drawings, if credit is inserted after pressing the button 60 but the button 62 is not pressed or no credit is inserted after pressing button 62, the screen will revert to a display of the single meter 52 and the gaming machine 10 will remain in single player status until the button 62 is pressed. This would cause any bets made using the standard buttons of the bank 22 of buttons automatically to apply to the meter 52. Thus, as shown in FIG. 6a of the drawings, assuming a player inserted forty seven credits into the machine 10 this would be reflected on the credit meter 52.1 of the meter 52 which is also highlighted. However, before player B could press the button 62 and insert any credits, player A commenced playing. Player A bets three credits by pressing the "Bet 1 Credit Per Line" button 58 on the bank 22 of buttons followed by the "Play 3 Lines" button 58. The screen automatically reverts to the single play mode as shown in FIG. 6b of the drawings. Due to a win on payline one, the player is awarded thirty credits which is reflected on the win meter 52.2 of the meter 52.

Figure 7A:
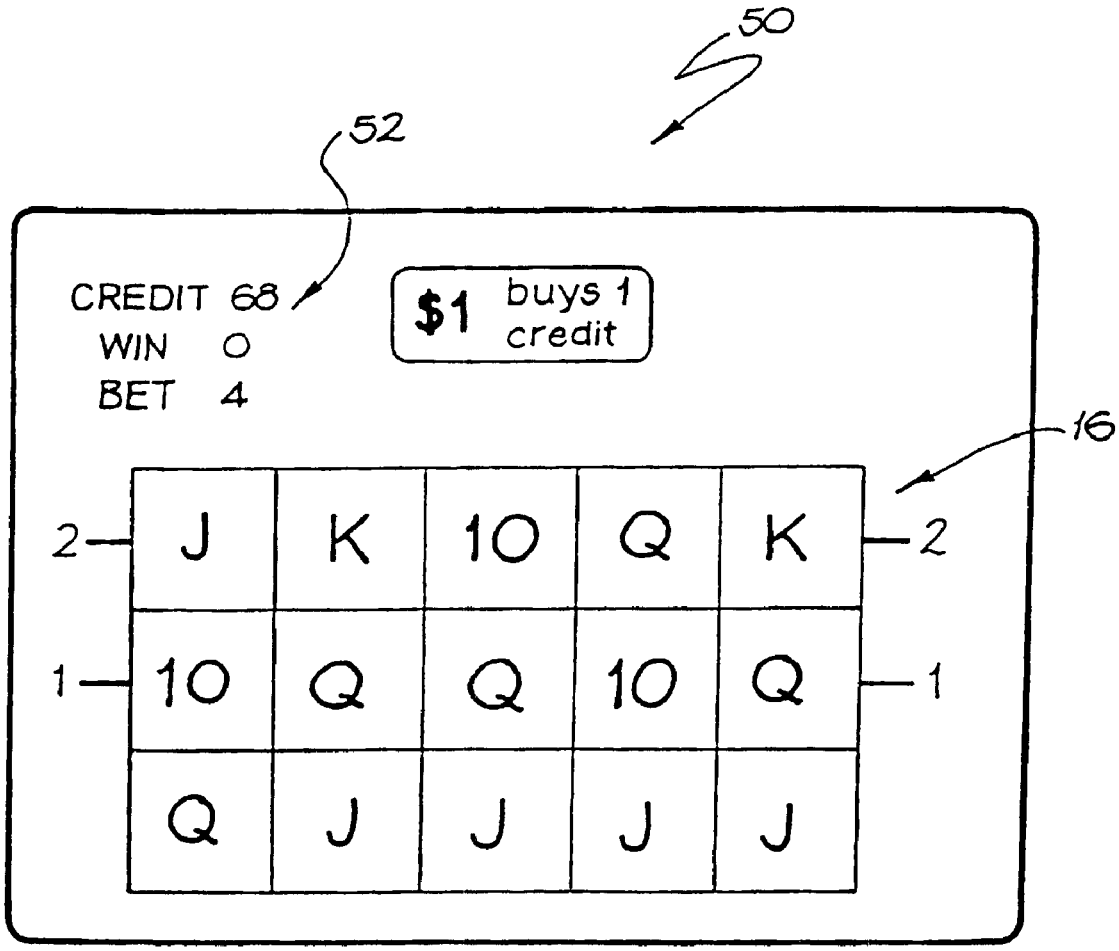
FIGS. 7a–7j show a sequence of screen displays of a third embodiment of a game played on the gaming machine.

In FIG. 7a of the drawings, it is assumed that a player is betting two credits per line on two lines. As only a single player had been playing the machine 10, only the meter 52 is displayed.

Figure 7B:
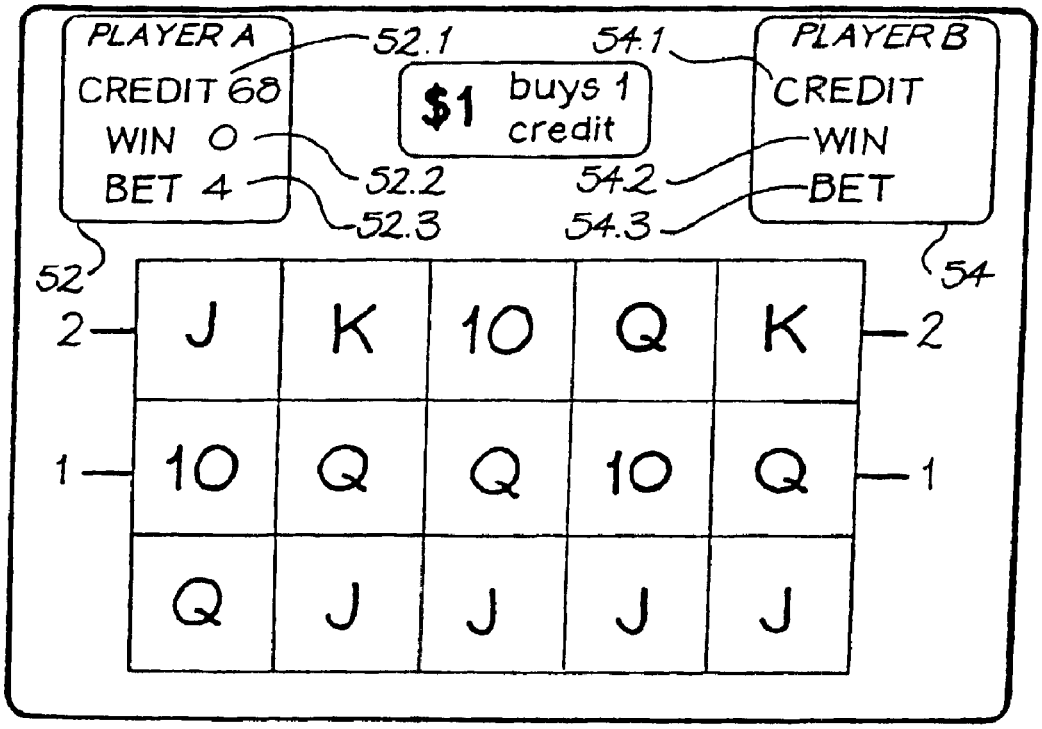

However, if the button 62 is pressed, and credit is inserted into the machine by player B, the second meter 54 is also displayed as shown in FIG. 7b of the drawings. The meter 54 is highlighted.

It is to be noted that the bet meter 54.3 of the meter 54 defaults to the corresponding bet meter 52.3 of the meter 52.

Figure 7C:
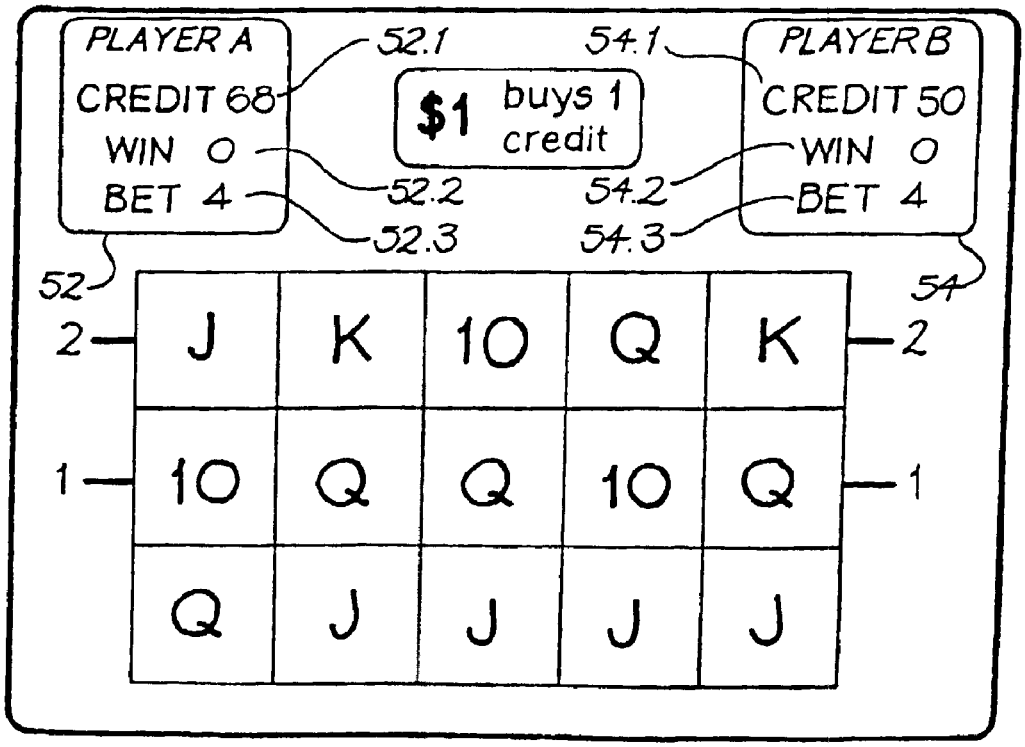
Figure 7D:
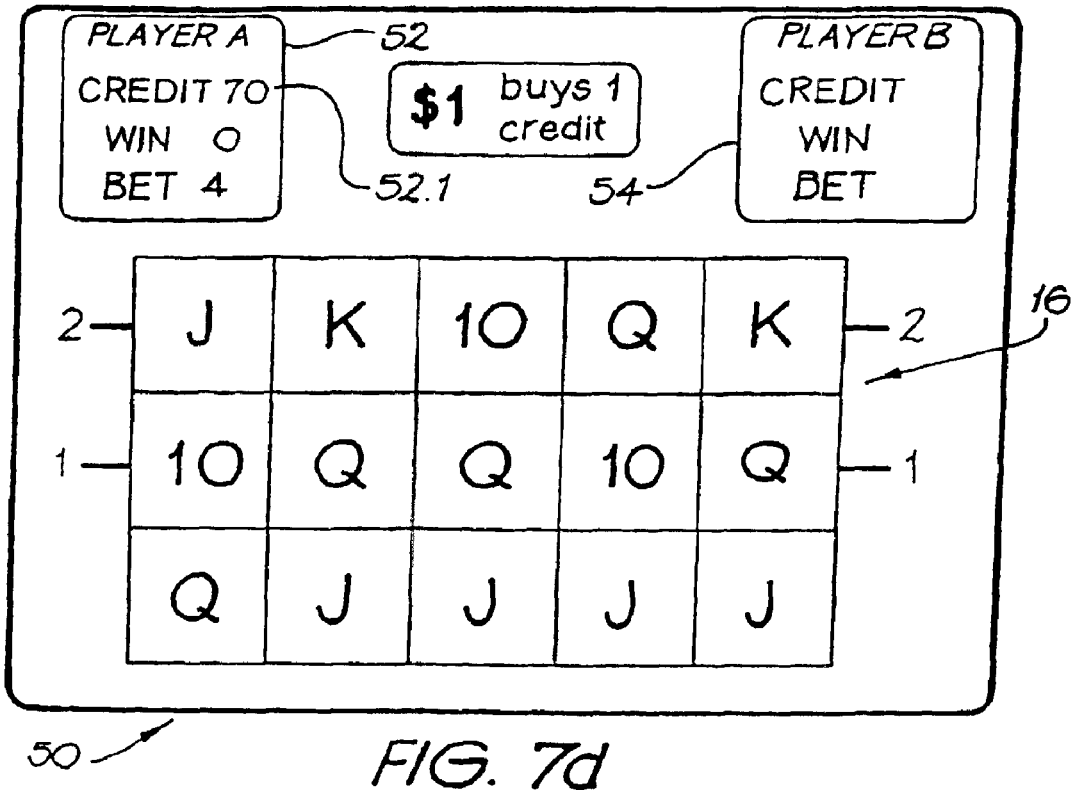

If, after player B has deposited credit, it is desired that player A plays first, the button 60 is pressed resulting in the meter 52 being highlighted as shown in FIG. 7c of the drawings. Player A then inserts an additional two credits bringing the total credits to seventy credits with this information being displayed on the credit meter 52.1. The meter 52 remains highlighted as shown in FIG. 7d of the drawings.

Figure 7E:
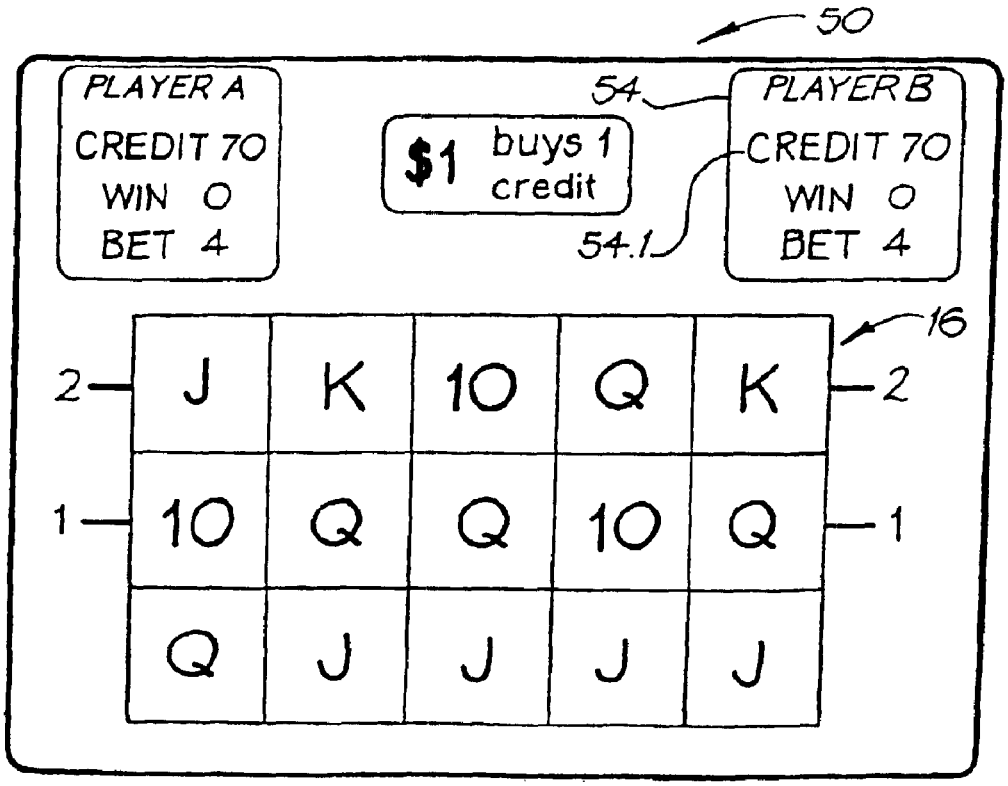

As shown in FIG. 7e of the drawings player B decides to match the credit of player A and inserts additional credits into the machine. This is effected by pressing the button 62 which highlights the meter 54 and the additional credits, once entered, are reflected on the credit meter 54.1 of the meter 54.

Figure 7F:
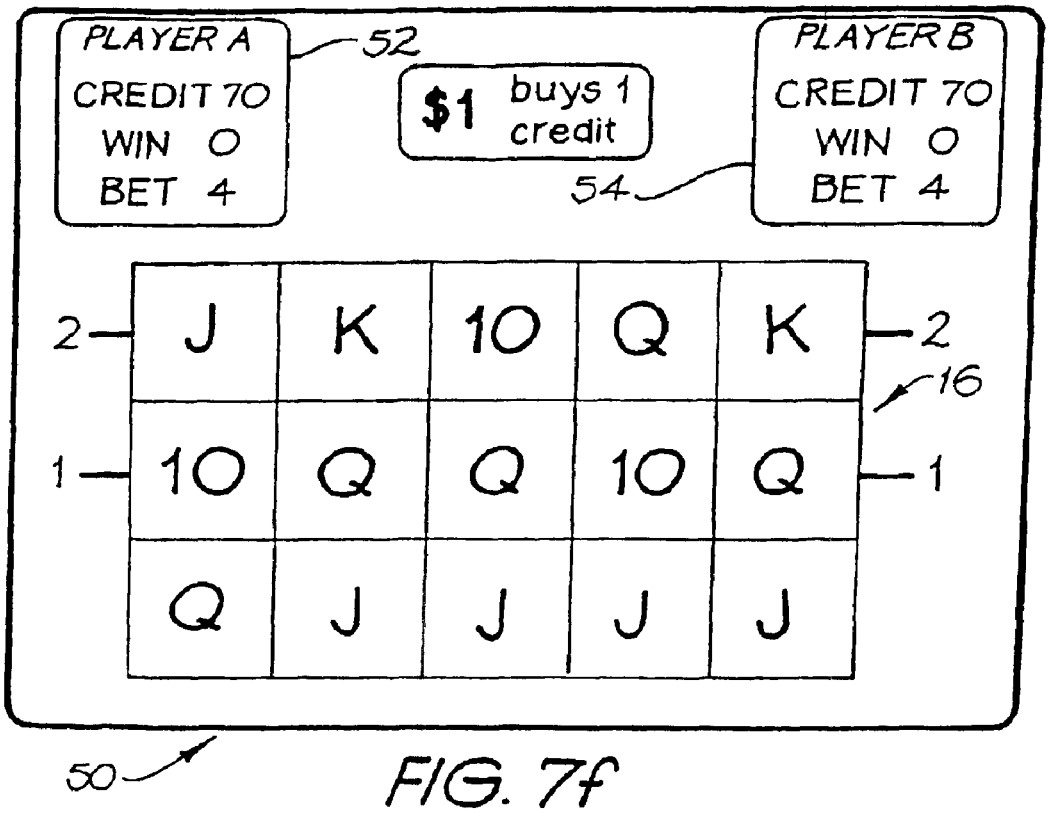
Figure 7G:
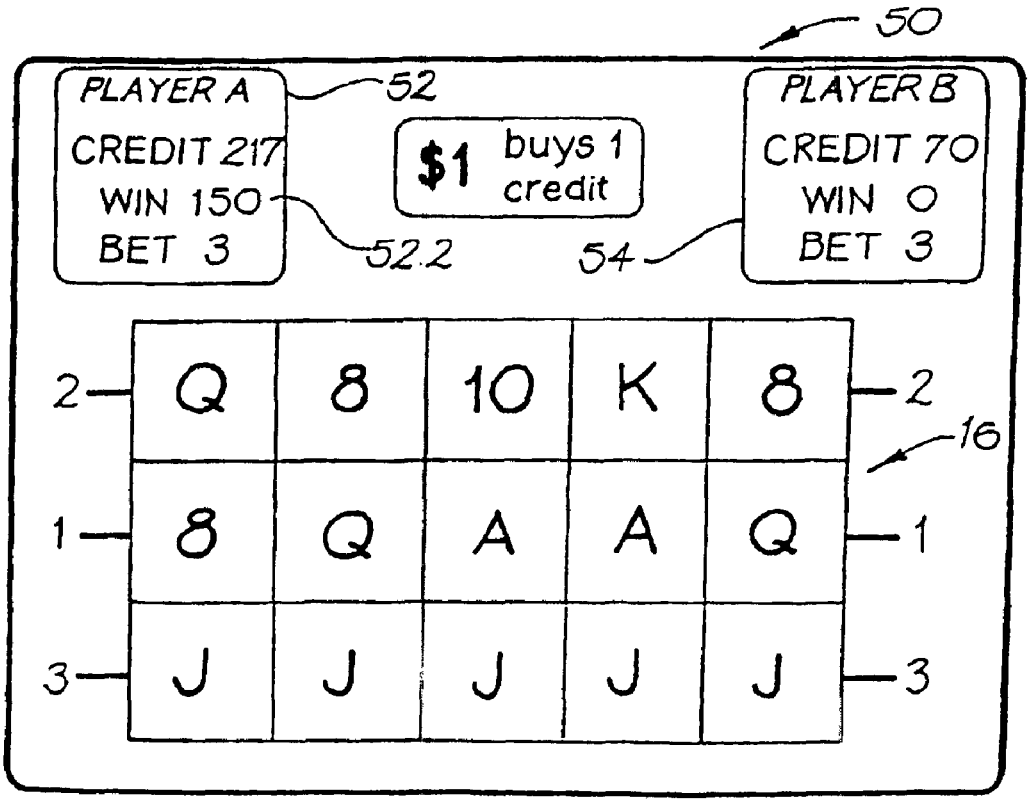

It is then decided that player A should commence playing. The button 60 is pressed resulting in the meter 52 being highlighted as shown in FIG. 7f of the drawings. Player A changes the betting strategy by pressing the "Bet 1 Credit Per Line" button 58 followed by the "Play 3 Lines" button 58, pressing the latter button causing the reels 18 to spin. The result is shown in FIG. 7g of the drawings and, for the win of 5×A on payline three, a win of one hundred and fifty credits results. This win is reflected on the win meter 52.2 of the meter 52.

When the win is made to player A and credited to the meter 52, the win meter 52.2 flashes to indicate that it is the highest current win. Also, after player A has completed playing, the turn automatically transfers to player B and the meter 54 is highlighted.

Figure 7H:
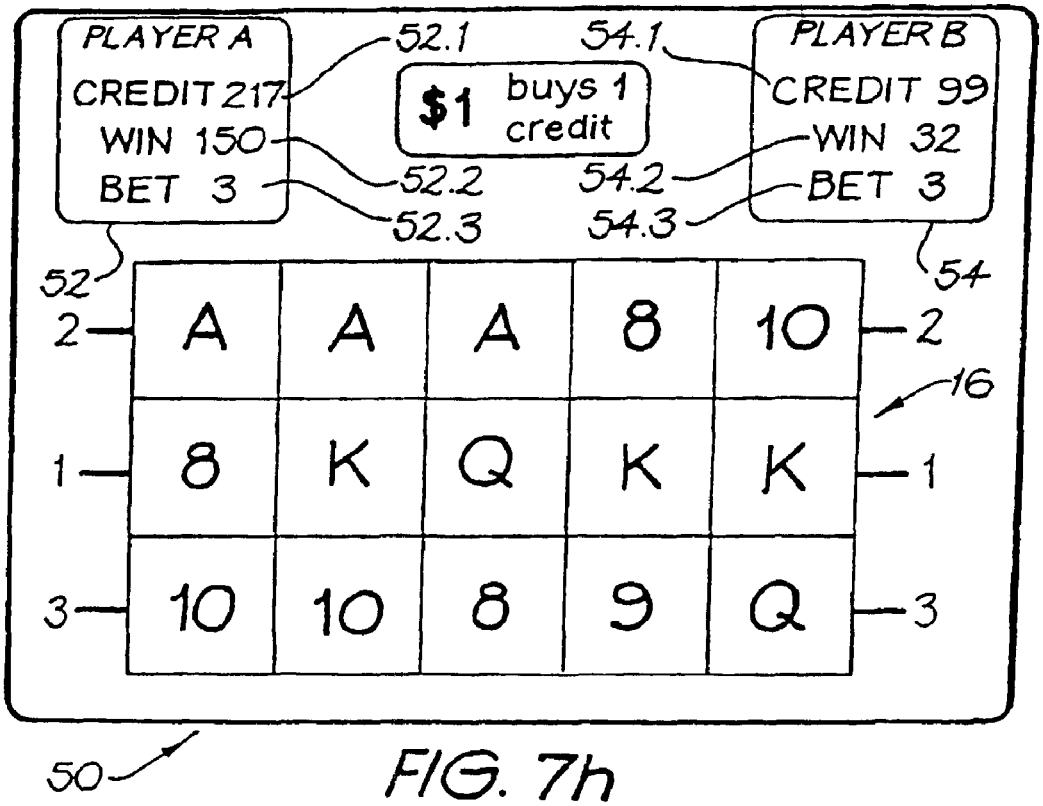

Player B then, via the button 62 causes the reels 18 to spin. For the 3×A on payline two, a win of thirty two credits is awarded to player B. This is reflected on the win meter 54.2 of the meter 54 as shown in FIG. 7h of the drawings. The win meter 52.2 continues flashing as, to date, it had the highest win.

Figure 7I:
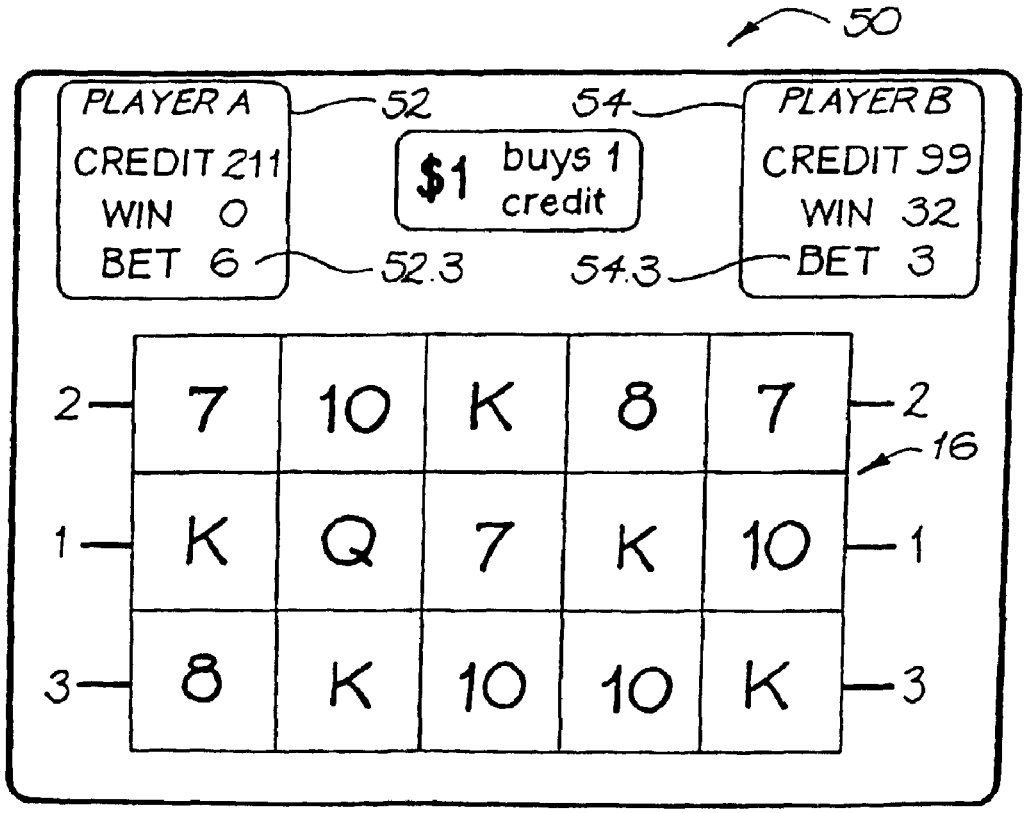
Figure 7J:
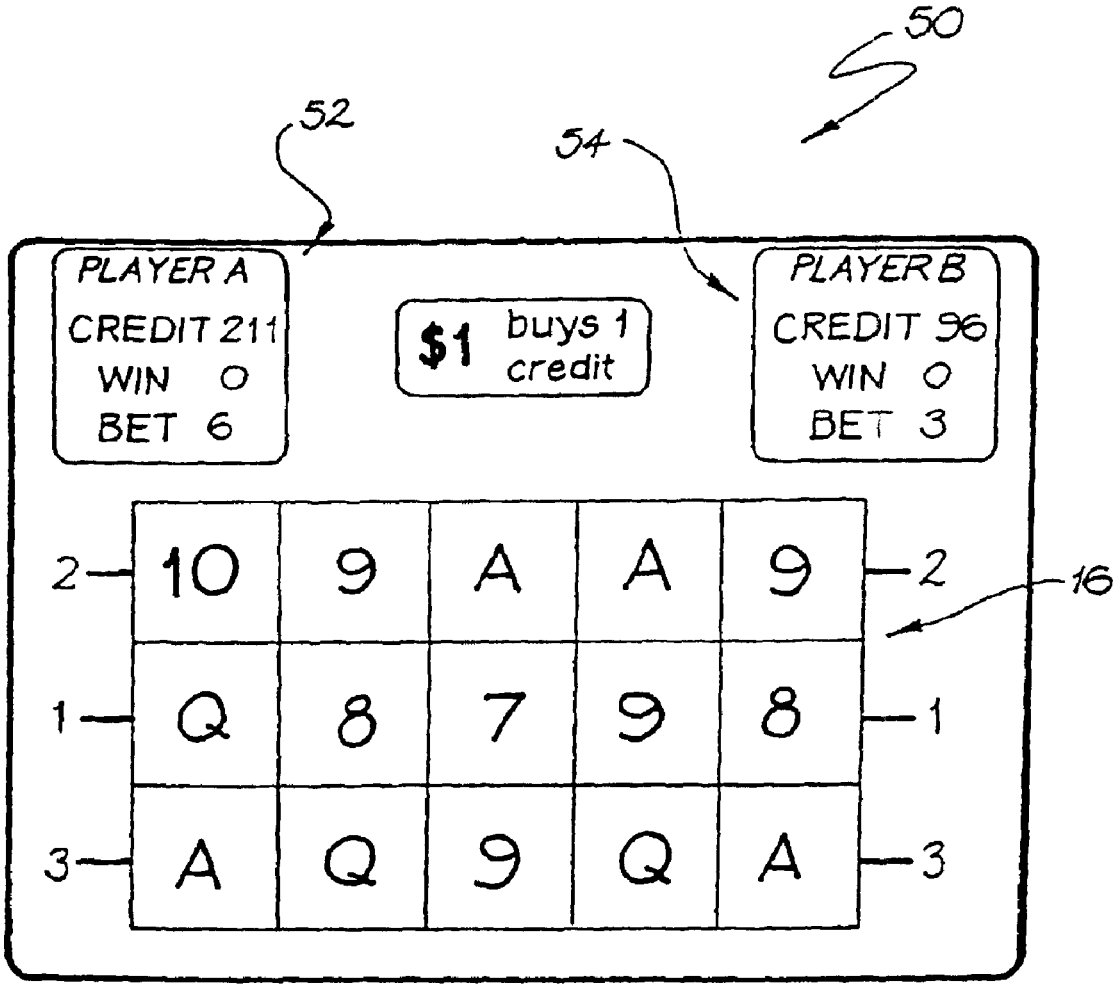

In FIG. 7i of the drawings, player A decides to increase the bet to two credits per line and does so by pressing the "Bet 2 Credits Per Line" button 58 of the bank 22 of buttons before player A presses button 60. The new bet is reflected on the bet meter 52.3 of the meter 52. After spinning of the reels 18, no win results and the turn transfers to player B as shown by the highlighted credit meter 54 on the screen 50. Also, as a result of player B having the previous win with player A not having won anything on player A's turn, the win meter 54.2 flashes. Player B decides to remain with betting one credit per line and, accordingly, the information displayed on the bet meter 54.3 of the meter 54 remains unchanged. Player B then causes the reels 18 to spin via the button 62. No win results as shown in FIG. 7j of the drawings. Thereafter, the meter 52 is highlighted indicating that it is, again, the turn of player A.

During the two player mode, any credit that is added to the gaming machine 10 will be credited to the meter of the player whose turn is indicated by the highlighted meter 52 or 54. Hence, during a two player session a player must await that player's turn before adding more credit. Also, during two player mode, as soon as one credit meter reaches zero then, when it next becomes that player's turn, a message advising the player to insert more credit will be displayed. If more credit is added, it will go to the meter 52 or 54 of the player whose turn it is and whose credit meter 52.1 or 54.1 is currently reading zero. Alternatively, if the other player button is pressed then the screen will revert to single player mode and the current values of all of the other player's meters will be transferred to the single set of meters which will normally be displayed on the left side of the screen 50. Play will then continue in single player mode requiring bets to be made from the standard bet buttons.

At any time when the gaming machine is in idle mode, the current available credit can be collected from the gaming machine. This is effected by pressing the "Collect" button of the bank 22 of buttons. All credits on both credit meters 52.1 and 54.1 will be paid out by the appropriate method whether it be by hopper, ticket printer, attendant pay, or any other method. It is preferred that the payout procedure results in the credits from the two credit meters 52.1 and 54.1 being dealt with separately in a single payout. Thus, for example, all the credits from credit meter 52.1 are paid out first followed by a pause to enable those credits to be collected and then the credits from the credit meter 54.1 are paid out or vice versa. It will be appreciated that variations of the payout procedure are possible.

In another embodiment of the invention, the buttons 60 and 62 may need to be pressed for changing the player turn. Thus, one of the players could have more than one turn before play is transferred to the other player by pressing the appropriate button 60 or 62. It will be appreciated that, in this embodiment, the button 60, 62 are not used to start the reels 18 spinning. Rather, one of the buttons 58 of the bank 22 of buttons will need to be pressed to start the reels 18 spinning as, otherwise, the gaming machine 10 would not be able to distinguish between a bet being made and a player turn being transferred. Still further, instead of separate bet meters 52.3 and 54.3 of the meters 52 and 54, a common bet meter may be provided. In this way, when in two player mode, the players will be encouraged to bet the same amount as each other. Once the bet has been initialised by one of the players, the same bet will apply in respect of each player's turn until the bet is manually changed by one of the players.

Hence, it is an advantage of the invention, that a gaming machine 10 is provided which promotes sociable gaming by automating the process of two or more people competing against each other on a single gaming machine. Essentially, a "mini tournament" is created. In this way, friends can play the same machine but can still bet from their own separate budgets keeping their own winnings to themselves and without being forced to bet on separate machines in order to do so.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming machine comprising:

a display for displaying images associated with a game played on the gaming machine, the images including a plurality of credit meters, each of the credit meters being associated with one of a plurality of players who are playing the game, the game being one in which one or more random events are caused to be displayed on the display and, if a predefined winning event results, a prize is awarded;

a game controller arranged to control the images displayed on the display, the game controller being arranged to, in response to at least one of the players wagering a credit amount, play the game;

a credit acceptor for accepting credit deposited by the players;

a credit allocator for, allocating credit to any one of the plurality of credit meters to thereby enable each of the plurality of credit meters to be credited with a credit amount selected by the player associated with that credit meter, irrespective of the credit amounts credited to any of the other credit meters.

2. The [gaining] *gaming* machine of claim 1 in which each credit meter forms part of a set of meters.

3. The [gaining] *gaming* machine of claim 2 in which the set of meters comprises, in addition to the credit meter, a win meter.

4. The gaming machine of claim 2 in which the set of meters also includes a bet meter.

5. The gaming machine of claim 1 in which the game controller is operable such that each credit meter indicates which player's turn it is.

6. The [gaining] *gaming* machine of claim 1 in which the game controller is operable such that each credit meter indicates which player has received a highest win in a round of games played by participating players.

7. The gaming machine of claim 1 in which the credit allocator comprises a switch arrangement for allocating the credits deposited into the credit acceptor to the credit meter associated with the player who deposited the credit, the switch arrangement including a switch associated with each player of the game.

8. The gaming machine of claim 7 in which each switch is operable to initiate the game for the player whose turn it is.

9. The gaming machine of claim 1 in which the switch arrangement comprises a bank of mechanical switches.

10. The gaming machine of claim 1 in which the switch arrangement comprises touch sensors associated with the display.

11. The [gaining] *gaming* machine of claim 1 in which the credit allocator is operable, upon completion of play by any one of the players, to pay out each withdrawing player's credit.

12. The gaming machine of claim 1 which has a default mode where, if the credit allocator is not operated prior to one of the players inserting the credit, only a single credit meter is displayed and the credit allocator allocates any credit deposited to the single credit meter.

13. The gaming machine of claim 1 in which the credit meters are displayed on the display alternately depending on which player is playing.

14. The gaming machine of claim 1 in which the credit meters are displayed on the display at the same time.

15. The gaming machine of claim 7 in which the switches are operable to change a turn of each player.

16. A gaming machine comprising:

a display for displaying images associated with a game played on the gaming machine, the images including a plurality of credit meters, each of the credit meters displaying a credit amount associated with one of a plurality of players who are playing the game, the game being one in which one or more random events are caused to be displayed on the display and, if a predefined winning event results, a prize is awarded;

a game controller arranged to control the images displayed on the display, the game controller being arranged to, in response to at least one of the players wagering a credit amount, play the game;

a payout device operable by either one of the players for, when operated, sequentially paying out the credit amounts displayed on the credit meters, the payout device being configured to pause between sequential payouts so that each payout is distinguished from the other payouts.

17. The gaming machine of claim 16 in which the payout device comprises at least one of a hopper and a ticket printer.

*18. A method for use with a gaming machine, the gaming machine including a display and a credit allocator, the method comprising the steps of:*

*displaying images on the display of the gaming machine, the images associated with a game played on the gaming machine, the images comprising a plurality of credit meters, each of the credit meters being associated with one of a plurality of players who are playing the game, the game being one in which one or more random events are caused to be displayed and, if a predefined winning event results, a prize is awarded; and*

*allocating credit by the credit allocator of the gaming machine to any one of the plurality of credit meters to thereby enable each of the plurality of credit meters to be credited with a credit amount selected by the player associated with that credit meter, irrespective of the credit amounts credited to any of the other credit meters.*

*19. The method as claimed in claim 18, wherein each credit meter forms part of a set of meters.*

*20. The method as claimed in claim 19, wherein the set of meters comprises, in addition to the credit meter, a win meter.*

*21. The method as claimed in claim 19, wherein the set of meters also includes a bet meter.*

*22. The method as claimed in claim 18, wherein each credit meter indicates which player's turn it is.*

*23. The method as claimed in claim 18, wherein each credit meter indicates which player has received a highest win in a round of games played by participating players.*

*24. The method as claimed in claim 18, further comprising the step of paying out by the credit allocator each withdrawing player's credit.*

*25. The method as claimed in claim 18, wherein the credit meters are alternately displayed on the display depending on which player is playing.*

*26. The method as claimed in claim 18, wherein the credit meters are displayed on the display at the same time.*

*27. A method for use with a gaming machine, the gaming machine including a display and a payout device, the method comprising the steps of:*

*displaying images on the display of the gaming machine, the images associated with a game played on the gaming machine, the images including a plurality of credit meters, each of the credit meters displaying a credit amount associated with one of a plurality of players who are playing the game, the game being one in which one or more random events are caused to be displayed and, if a predefined winning event results, a prize is awarded;*

*sequentially paying out by the payout device, when operated, of the gaming machine the credit amounts displayed on the credit meters, the pay out device being operable by either one of the players; and*

*pausing the payout device between sequential payouts so that each payout is distinguished from the other payouts.*

*28. The method as claimed in claim 18, wherein the credit allocator comprises a switch arrangement for allocating credit deposited into the gaming machine to the credit meter associated with the player who deposited the credit, the switch arrangement including a switch associated with each player of the game.*

*29. A gaming machine comprising:*

*a display for displaying of images associated with a game played on the gaming machine, the images including a plurality of credit meters;*

*at least one button;*

*a game controller;*

*a data storage device comprising software, and*

*a credit allocator for, allocating credit to any one of the plurality of credit meters to thereby enable each of the plurality of credit meters to be credited with a credit amount selected by the player associated with that credit meter, irrespective of the credit amounts credited to any of the other credit meters,*

*wherein the game controller and data storage device are arranged such that the game controller can execute the software, whereby execution of the software: allows the game controller to detect an activation of the button by a player; and cause an additional player credit meter to be displayed on the display thereby resulting in a plurality of distinct player credit meters being displayed on the display.*

*30. A method for use with a gaming machine, the gaming machine including a button for activation by a player, a display, and a credit allocator, the method comprising the steps of:*

*detecting the activation of the button on the gaming machine by the player; displaying on the display of the gaming machine an additional player credit meter thereby resulting in a plurality of distinct player credit meters being displayed on the display and*

*allocating credit by the credit allocator to any one of the plurality of credit meters to thereby enable each of the plurality of credit meters to be credited with a credit amount selected by the player associated with that credit meter, irrespective of the credit amounts credited to any of the other credit meters.*

*31. The gaming machine of claim 29 in which the credit allocator comprises a switch arrangement for allocating credit deposited into the gaming machine to the credit meter associated with the player who deposited the credit, the*

*switch arrangement including a switch associated with each player of the game.*

*32. The method as claimed in claim 30, wherein the credit allocator comprises a switch arrangement for allocating credit deposited into the gaming machine to the credit meter associated with the player who deposited the credit, the switch arrangement including a switch associated with each player of the game.*

* * * * *